United States Patent
Madsen et al.

(10) Patent No.: US 12,009,970 B2
(45) Date of Patent: Jun. 11, 2024

(54) FLEXIBLE NETWORK MANAGEMENT SYSTEM FOR CONFIGURING NETWORK DEVICES

(71) Applicant: Arista Networks, Inc., Santa Clara, CA (US)

(72) Inventors: Ryan Madsen, Santa Clara, CA (US); Srinivas Kommu, Cupertino, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/537,408

(22) Filed: Nov. 29, 2021

(65) Prior Publication Data

US 2023/0171151 A1    Jun. 1, 2023

(51) Int. Cl.
*H04L 41/0803* (2022.01)
*G06F 3/0484* (2022.01)

(52) U.S. Cl.
CPC ........ *H04L 41/0803* (2013.01); *G06F 3/0484* (2013.01)

(58) Field of Classification Search
CPC ............... H04L 41/0803; H04L 41/084; H04L 41/0843; H04L 41/0846; G06F 3/0484
See application file for complete search history.

(56) References Cited

U.S. PATENT DOCUMENTS

| | | | |
|---|---|---|---|
| 9,094,299 B1 * | 7/2015 | Rao D.S | H04L 41/0803 |
| 9,426,030 B1 * | 8/2016 | Anerousis | H04L 41/08 |
| 2008/0235231 A1 * | 9/2008 | Gass | G06F 21/6227 707/999.102 |
| 2014/0123299 A1 * | 5/2014 | Jung | G06F 21/62 726/26 |
| 2014/0237443 A1 * | 8/2014 | Pana | G06F 8/38 717/105 |
| 2016/0050116 A1 * | 2/2016 | Sheshadri | H04L 41/0843 709/221 |
| 2017/0103103 A1 * | 4/2017 | Nixon | G06F 16/256 |
| 2020/0374194 A1 * | 11/2020 | Laribi | H04L 41/40 |
| 2022/0166679 A1 * | 5/2022 | Hafeez | H04L 45/04 |

FOREIGN PATENT DOCUMENTS

CN           109597655 A  *  4/2019  ......... G06F 9/44505

* cited by examiner

*Primary Examiner* — Schquita D Goodwin
*Assistant Examiner* — Mehulkumar J Shah
(74) *Attorney, Agent, or Firm* — Fountainhead Law Group, P.C.

(57) ABSTRACT

Embodiments of the present disclosure include systems and methods for providing a flexible network management system for configuring network devices. A studio definition specifying a set of configuration parameters for configuring network devices in a plurality of network devices is received. A workspace definition associated with the studio definition, the workspace definition specifying values for a subset of the set of configuration parameters is received. A set of build operations on the studio definition and the workspace definition are performed to generate a set of configuration commands for a subset of the plurality of network devices. The subset of the plurality of network devices are configured based on the set of configuration commands.

20 Claims, 11 Drawing Sheets

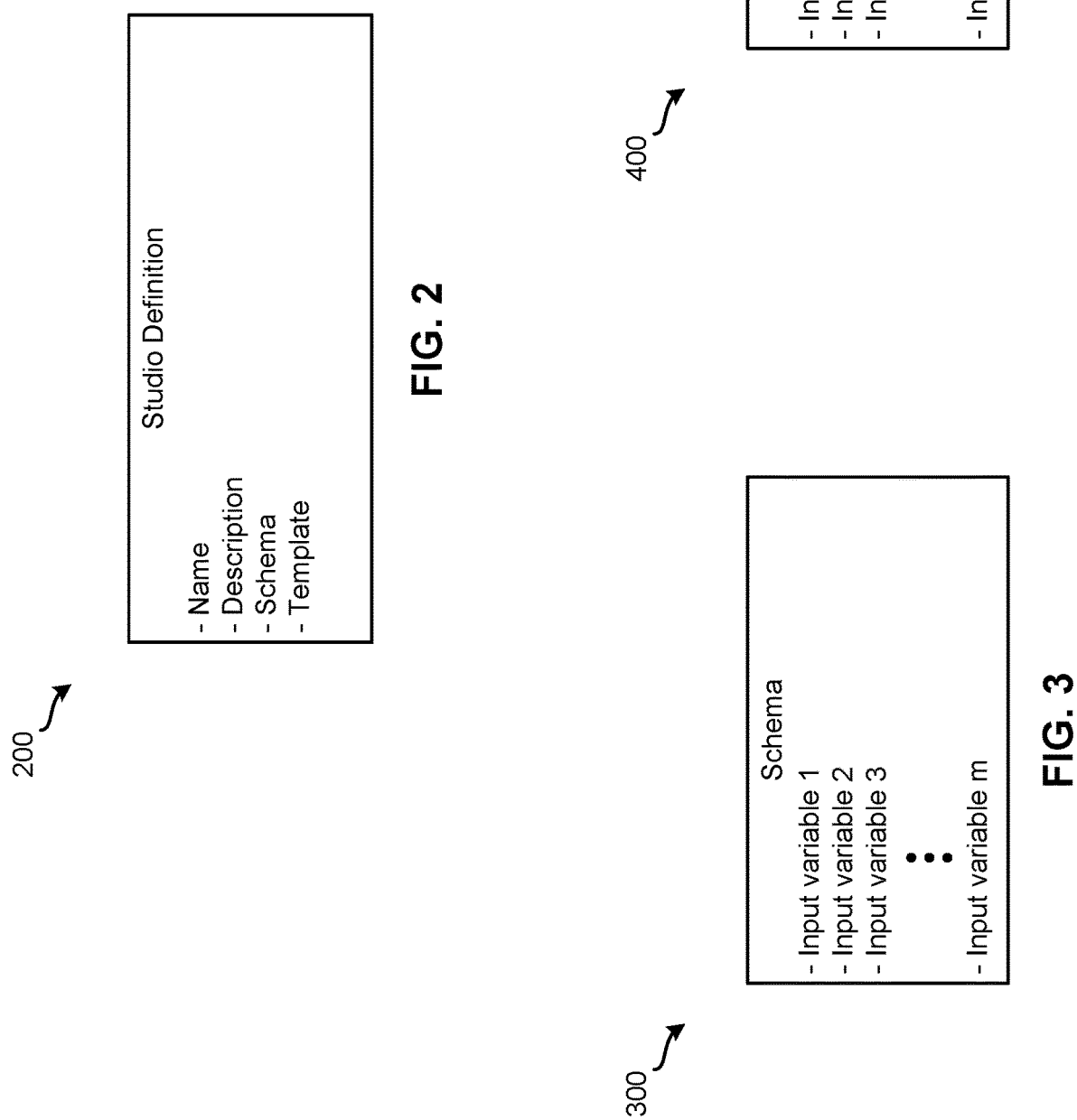

Create Workspace for Studio W

Name
[Workspace B] — 1005

Description
1010 — [Set configuration for feature Z] — 1015

Input Variables

| Resolver Input Variable | Base Input Variable |
|---|---|
| 1030 — [Tag value 1] | [Value 1] — 1035 |
| 1040 — [Tag value 2] | [Value 2] — 1045 |
| 1050 — [Tag value 3] | [Value 3] — 1055 |

[Add Row] — 1025

FLEXIBLE NETWORK MANAGEMENT SYSTEM FOR CONFIGURING NETWORK DEVICES

BACKGROUND

Networking devices (e.g., hubs, switches, routers, bridges, gateways, etc.) are typically used to facilitate the communication of data in a computer network. A computer network can be configured to behave in any number of different ways. To configure a computer network in a particular way, each of the networking devices need to be configured correctly. Different networking devices may be configured in different ways. For example, some networking devices can be configured via a web browser that is connected to the networking devices. Other network devices may be configured directly via an interface (e.g., a command line interface) provided by the networking devices. Some network devices are plug and play, and, thus, do not have to be configured at all.

The following detailed description and accompanying drawings provide a better understanding of the nature and advantages of various embodiments of the present disclosure.

BRIEF DESCRIPTION OF THE DRAWINGS

FIG. 2 illustrates an example studio definition according to some embodiments.

FIG. 3 illustrates an example schema according to some embodiments.

FIG. 4 illustrates an example template according to some embodiments.

FIG. 10 illustrates another GUI for creating a workspace for a studio according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for providing a flexible network management system for configuring network devices. In some embodiments, a network management system can configure network devices in a network through the use of studios and workspaces. A studio may define a scope of configuration of network devices in the network. A scope of configuration of network devices can be referred to as a configuration of a network feature. In some embodiments, a studio definition specifies a set of input variables and instructions for how to convert values for the set of input variables into commands for configuring different network devices in the network. A workspace serves as a staging ground through which changes can be made to one or more defined studios. To configure a network feature defined by a studio, a user may create a workspace that is associated with the studio. The user can provide values for the set of input variables specified in the studio. Once the user requests to build the workspace, the network management system processes the workspace and the studio through a build processing pipeline. After successfully building the workspace and studio, the user may request to submit the workspace. In response to the request, the network management system generates commands for network devices affected by the workspace and then applies the commands to the network devices in order to configure them.

Figure 1:
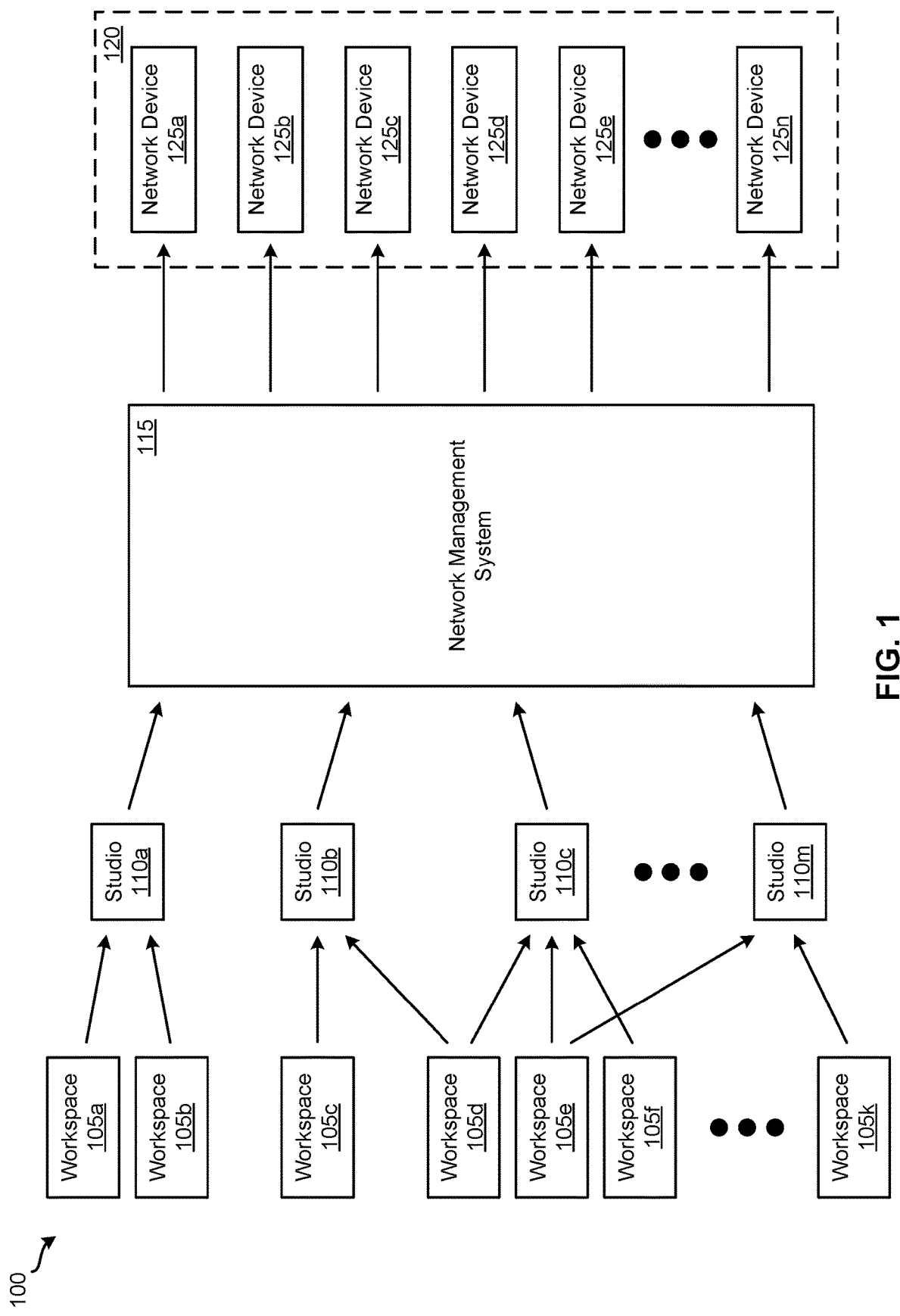
FIG. 1 illustrates a system for managing network devices according to some embodiments.

FIG. 1 illustrates a system 100 for managing network devices according to some embodiments. As shown, system 100 includes workspaces 105a-k, studios 110a-m, network management system 115, and network 120. FIG. 1 depicts network 120 including network devices 125a-n. Each of the network devices 125a-n can have an operating system (OS) operating on it that is configured for facilitating the operation of the network device. In some embodiments, the OS operating on the network device 125 provides an interface (e.g., a command-line interface (CLI)) through which the network device 125 receives commands (e.g., CLI commands) for configuring the network device 125.

Each of studios 110a-m define a scope of configuration of network devices 125a-n in network 120. As mentioned above, a scope of configuration of network devices 125a-n may be referred to as a network feature. Example of network features may include configuring Internet Protocol (IP) addresses; configuring domain name server (DNS) settings; configuring network time protocol (NTP) settings; configuring service policies (e.g., maximum transmission unit (MTU) settings, quality of service (QoS) settings, etc.); configuring virtual local area networks (VLANs); configuring port settings; configuring a campus access switch deployment; configuring an Ethernet virtual private network (EVPN) deployment; configuring multi-chassis link aggregation (MLAG) settings; etc. In some embodiments, each studio 110 is responsible for tracking a defined portion of configuration (e.g., a network feature) of network 120 (e.g., a studio for tracking configuration related to a particular routing protocol, a studio for tracking configuration related to interface configuration state, etc.). That is, each studio 110 stores the current configuration state of the defined portion of configuration of network 120.

In some embodiments, a studio definition that defines a studio specifies a set of input variables (also referred to as configuration parameters) for configuring a particular network feature. In addition, a studio definition specifies a set of instructions for converting values for the set of input variables into commands (e.g., CLI commands) for configuring one or more network devices 125a-n. FIG. 2 illustrates an example studio definition 200 according to some embodiments. As shown, studio definition 200 includes a name for identifying a studio, a description of the studio, a schema, and a template. In some embodiments, a schema specifies a set of input variables for configuring a particular network feature and a template specifies a set of instructions for converting values for the input variables into commands for configuring network devices. In some such embodiments, commands generated by a template for a particular network device are understandable by an OS operating on the network device.

FIG. 3 illustrates an example schema 300 according to some embodiments. As depicted in FIG. 3, schema 300 includes input variables 1-m. In some embodiments, each input variable may include the following attributes (also referred to as general attributes): a unique key for referencing the input variable, a variable name for referencing a value of the input variable, a display name of the input variable, a description of the input variable, and an indicator for indicating whether the input variable requires a value. Different types of input variables may be specified in a schema of a studio definition. For instance, one type of input variable is a base type input variable. In some embodiments, a base type input variable is configured to store a value and has a defined format. As such, base type input variables can be validated to ensure the value matches the defined format. In some embodiments, a base type input variable can include the following additional attribute: a default value for the input variable. Additionally, a base type input variable may include a set of constraints for restricting the values that can be stored for the base type input variable.

An example of a base type input variable is a string input variable configured to store string values. A string input variable can include one or more of the following constraints: a format constraint (e.g., an IP address format, an IPv6 address format, a media access control (MAC) address format, etc.), a range of string length constraint (e.g., 5-10, min-10, 5-max, etc.), a pattern constraint (e.g., a regular-expression-based pattern constraint (e.g., "^[0-9a-fA-F]*$"), etc.), and an option constraint that specifies a list of valid static and/or dynamic string values. Another base type input variable is an integer input variable configured to store integer values. An integer input variable may include one or more of the following constraints: a range of integer value constraint (e.g., values between −10 and 10, values between a min value and 10, a range of values between −10 and a max value, etc.) and a option constraint that specifies list of valid integer values. A float input variable configured to store float values is another example of a base type input variable. A float input variable can include an option constraint that specifies a list of valid float values. Yet another base type input variable may be a Boolean input variable configured to store Boolean values.

Another type of input variable may be a container type input variable. In some embodiments, a container type input variable is a type of input variable that wraps one or more base type input variables in order to enhance and/or consolidate the base type input variables. For example, container type input variables can be used to assign a set of input variables to a specific group of devices, allow studios to provide multiple values for a given input variable, or group multiple base type input variables and make them into a single unit of input. One example of a container type input variable is a resolver input variable. In some embodiments, a resolver input variable is configured to assign its member input variable values to a tag. A resolver input variable may be used in cases where an input variable value is conditional on a network device or a group of network devices. Tags are resolved at run time and each affected network device is given the value that corresponds to the tag to which it is assigned. In addition to the general attributes mentioned above, a resolver input variable may include the following attributes: a resolver type attribute (e.g., a multi-tag resolver, a single-tag resolver, etc.), a tag type attribute (e.g., device tags, interface tags, etc.), a display mode attribute (e.g., a display all mode where all available tags are pre populated, a member attribute for specifying an input variable (e.g., a base input variable) associated with the resolver input variable. In some embodiments, a multi-tag resolver allows matching on multiple tag labels (e.g., all devices that are tagged with a certain data center tag and a role tag) whereas a single-tag resolver restricts the match to one tag (e.g., a device with a certain name). A collection input variable is another type of container type input variable. In some embodiments, a collection input variable is configured to convert its member input variable values into a list. This allows multiple values to be provided for the member input variable of a collection type input variable. In addition to the general attribute described above, a collection input variable can include a member attribute for specifying an input variable (e.g., a base input variable) associated with the collection input variable. Yet another type of container type input variable is a group input variable. In some embodiments, a group input variable is configured to group multiple member input variables into a single unit of input. A group input variable may be used in instances where input variable values are consolidated (e.g., into a dictionary) for use in a template or multiple inputs are attached to a resolver input variable (e.g., in order to assign multiple input variable values to a tag) or a collection input variable (e.g., in order to get multiple input variable values of the group input variable). In addition to the general attributes mentioned above, a group input variable may include a member attribute for specifying one or more input variables (e.g., base input variables).

FIG. 4 illustrates an example template 400 according to some embodiments. As mentioned above, a template specifies a set of instructions for converting values for the input variables into commands for configuring network devices. As depicted in FIG. 4, template 400 includes a set of instructions 1-n for converting values of input variables into commands for configuring network devices. The set of instructions 1-n can be specified using any number of different programming languages. For instance, the set of instructions 1-n can be specified using a Python-based programming language.

Returning to FIG. 1, each of the workspaces 105a-k serves as a staging ground through which changes can be made to one or more studios. When a workspace is created, the workspace is associated with a studio. The workspace may be used to propose changes and submit changes to the associated studio. For example, workspace 105c is associated with studio 110b, as shown in FIG. 1. Therefore, workspace 105c can be used to propose changes and submit changes to studio 110b. In some instances, a workspace can be associated with multiple different studios. Such a workspace 105 may be used to propose changes and submit changes to each of the associated studios 110. In this example, workspace 105d is associated with studio 110b and studio 110c. As such, workspace 105d can be used to propose changes and submit changes to studios 110b and 110c. As another example, workspace 105e is associated with studio 110c and studio 110m. Thus, workspace 105e may be used to propose changes and submit changes to studios 110c and 110m.

In some embodiments, multiple workspaces can be associated with the same studio. For this example, workspace 105a is associated with studio 110 and workspace 105b is also associated with studio 110a. Users of different workspaces associated with the same studio can propose different sets of changes to the studio concurrently. Once proposed changes to a studio are submitted via a workspace, the studio is updated with the changes and the changes are pushed to network devices 125a-n. Any existing workspaces associated with the studio are automatically rebuilt to include the submitted changes. In this fashion, multiple users are allowed to work on (e.g., propose changes) the same studio without influencing or affecting one another.

Figure 5:
FIG. 5 illustrates an example workspace definition according to some embodiments.

FIG. 5 illustrates an example workspace definition 500 according to some embodiments. As shown, workspace definition 500 includes a name for identifying a workspace, a description of the workspace, and a studio definition identifier for identifying a studio definition with which the workspace is associated. In some embodiments, proposed changes to the studio definition associated with workspace definition 500 (e.g., proposed values for a set of input variables specified in the studio definition) and new tag definitions and/or modifications to tag definitions proposed through workspace definition 500 may be stored in workspace definition 500 (not shown). In this manner, a workspace can be responsible for tracking modifications to studios and tag definitions.

Figure 6:
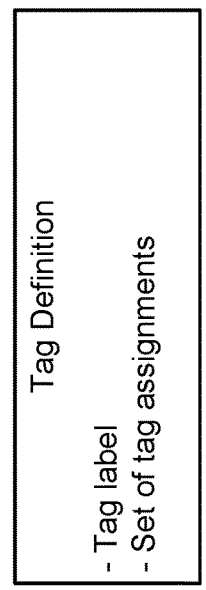
FIG. 6 illustrates an example tag definition according to some embodiments.

FIG. 6 illustrates an example tag definition 600 according to some embodiments. As illustrated, tag definition 600 includes a tag label and a set of tag assignments. The tag label may be a value used as a label for the tag. For example, the tag label can be a string value (e.g., datacenter, edge router, hostname-x, interface-d, etc.). The set of tag assignments may specify a set of network devices and/or interfaces of network devices (e.g., identifiers of network devices and/or identifiers of interfaces of network devices) to which the tag label is assigned. Using tag definitions structured like tag definition 600 allows a specific network device, a specific interface of a network device, a specific subset of network devices, and/or a specific set of interfaces of one or more network devices to be identified. This way, network configurations can be restricted to the identified network device(s)/interface(s).

Returning to FIG. 1, network management system 115 is configured to manage the configuration of network devices 125a-n. For instance, network management system 115 may receive a workspace and an associated studio along with a request to process the proposed changes to the studio. In response to the request, network management system 115 processes the workspace and the studio through a build processing pipeline. The build processing pipeline performs various operations that can include validating the proposed changes to the studio, determining the network devices 125a-n affected by the change, generating commands for each of the affected network devices 125a-n, and using the commands to configure each of the affected network devices 125a-n. Details of the build processing pipeline will be described below.

Figure 7:
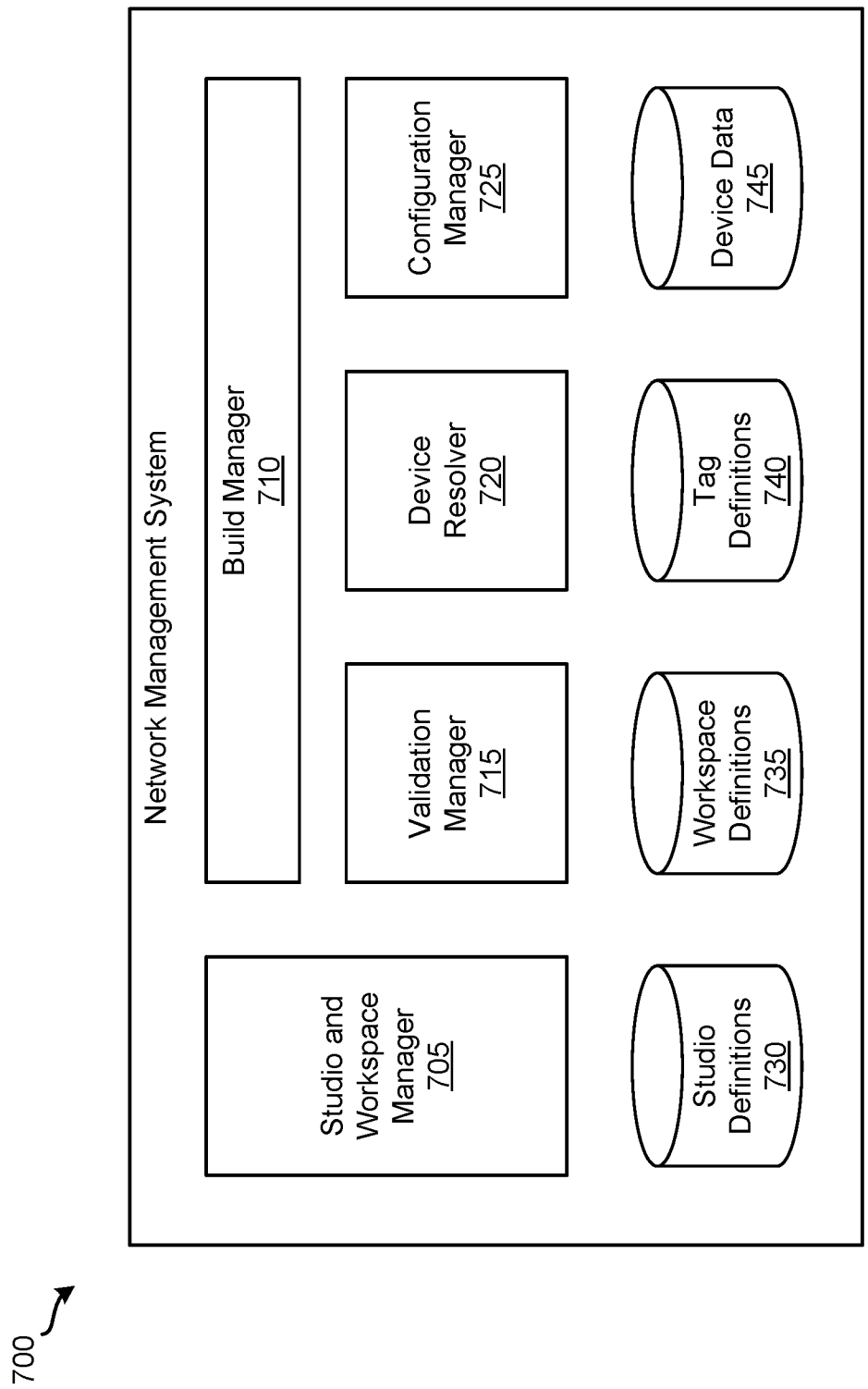
FIG. 7 illustrates an architecture of a network management system according to some embodiments.

FIG. 7 illustrates an architecture of a network management system 700 according to some embodiments. In some embodiments, network management system 700 may be used to implement network management system 115. As shown, network management system 700 includes studio and workspace manager 705, build manager 710, validation manager 715, device resolver 720, configuration manager 725, and storages 730, 735, 740, 745.

Studio definitions storage 730 stores studio definitions (e.g., studio definition 200). Workspace definitions storage 735 is configured to store workspace definitions (e.g., workspace definition 500). Tag definitions storage 740 stores tag definitions (e.g., tag definition 600). Device data storage 745 is configured to store information associated with network devices (e.g., network devices 125a-n). Examples of information associated with network devices include a network device name or identifier for uniquely identifying the network device, a manufacturer of the network device, a model name of the network device, a version of software (e.g., a network OS) installed and executing on the network device, an IP address of the network device, a MAC address of the network device, information for connecting to the network device (e.g., in order to program the network device), etc.

Studio and workspace manager 705 is responsible for managing studios and workspaces. For example, studio and workspace manager 705 can receive studio definitions and workspace definitions from client devices (not shown) communicating with network management system 700. In response to receiving a studio definition, studio and workspace manager 705 stores it in studio definitions storage 730. In response to receiving a workspace definition, studio and workspace manager 705 stores it in workspace definitions storage 735.

Figure 8A:
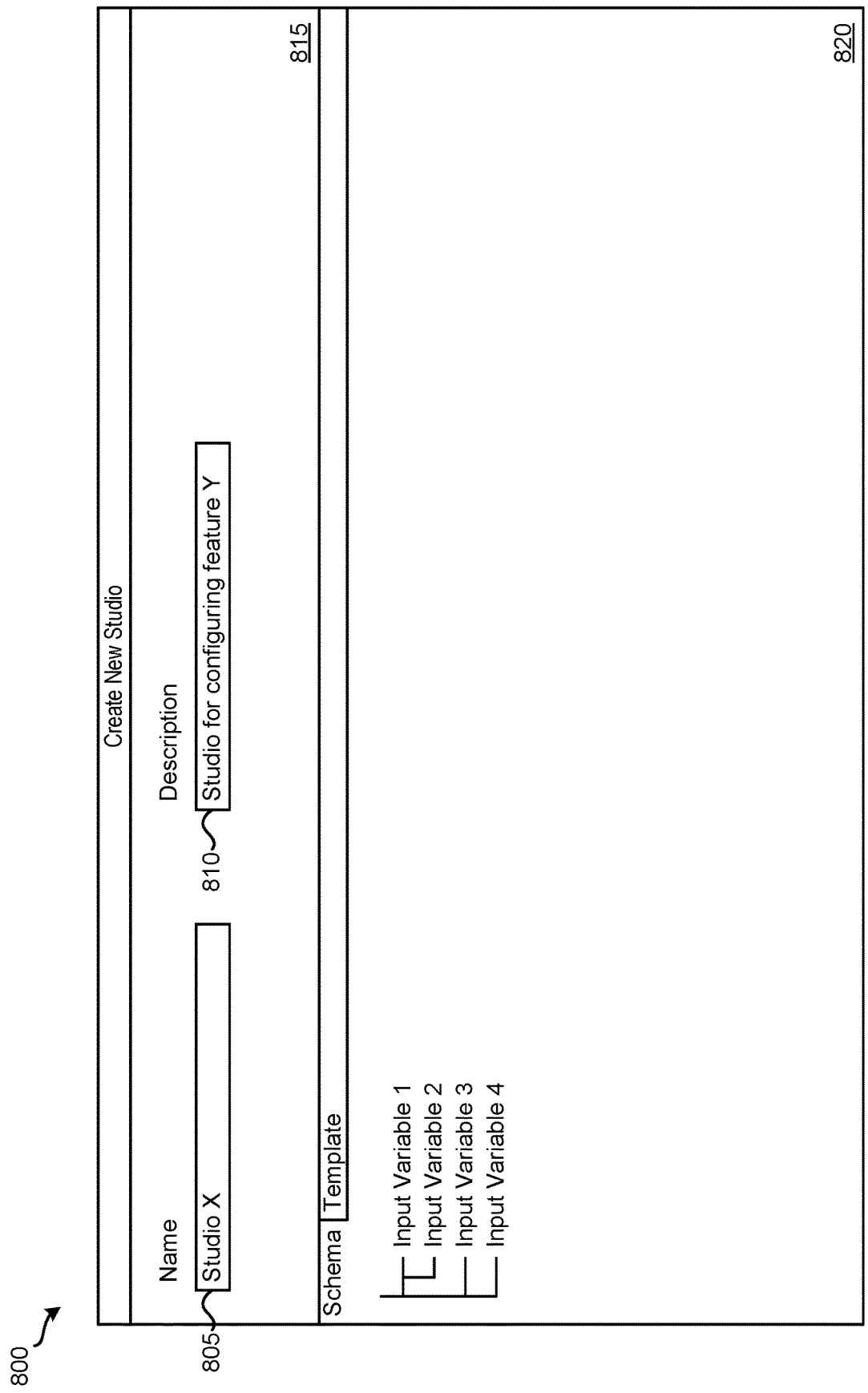
FIGS. 8A and 8B illustrate a graphical user interface (GUI) for creating a studio according to some embodiments.
Figure 8B:
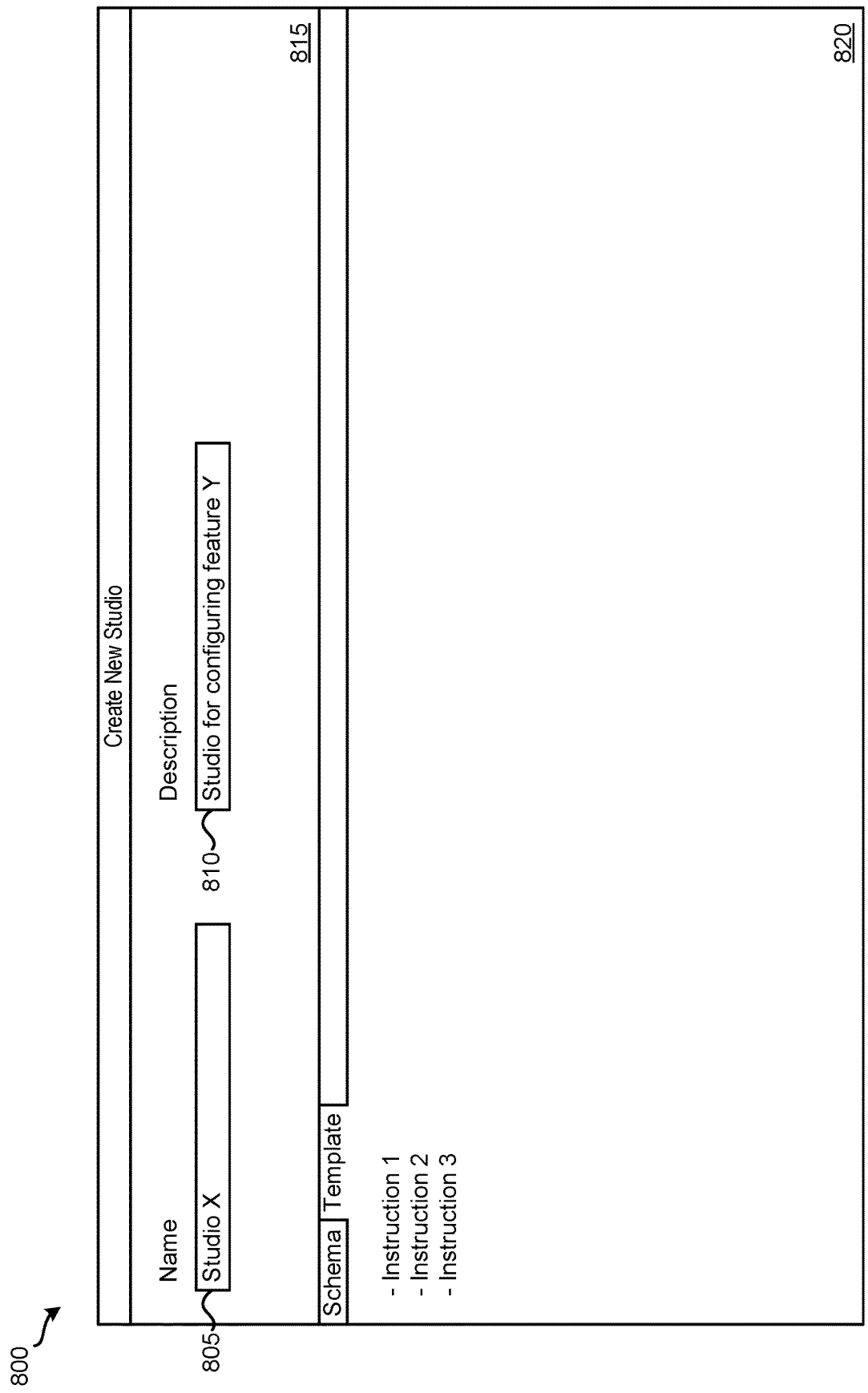

In some embodiments, studio and workspace manager 705 provides client devices with a GUI for creating studios and workspaces. FIGS. 8A and 8B illustrate a GUI 800 for creating a studio according to some embodiments. Specifically, FIGS. 8A and 8B illustrate two stages of creating a studio via GUI 800. As shown in FIG. 8A, GUI 800 includes display area 815 and display area 820. Display area 815 includes user interface (UI) control 805 and UI control 810. UI control 805 is for providing a name of a studio while UI control 810 is for providing a description of the studio. In this example, the name "Studio X" is provided through UI control 805 by a user of a client device to which studio and workspace manager 705 is providing GUI 800. In addition, the user of the client device has provided, through UI control 810, "Studio for configuring feature Y" as the description of the studio.

As depicted in FIG. 8A, display area 820 is providing a page for creating a schema for the studio. As explained above, a schema specifies a set of input variables for configuring a particular network feature, in some embodiments. Here, a user of a client device has created four input variables 1-4. In some embodiments, an input variable can be specified to be a member of another input variable. For example, a base type input variable may be specified to be a member of a container type input variable. Display area 820 can be configured to display a first input variable that is specified to be a member of a second input variable as nested under the second input variable. For this example, input variable 2 is specified as a member of input variable 1. Therefore, display area 820 displays input variable 2 as nested under input variable 1, as shown in FIG. 8A.

In FIG. 8B, display area 820 is providing a page for creating a template for the studio. As mentioned above, in some embodiments, a template specifies a set of instructions for converting values for the input variables into commands for configuring network devices. Here, the user of the client device provided instructions 1-3 for converting values for input variables 1-4 shown in FIG. 8A into commands for configuring network devices (e.g., network devices 125a-n). In some cases, the set of instructions specified in a template for a studio references values provided for one or more input variables specified for a schema for the studio. Once the user of the client device is finished defining the studio, the user of the client device may send studio and workspace manager 705 a request to create the studio (e.g., by selecting a selectable UI item in GUI 800 (not shown) for requesting to create the studio). In response to receiving the request, studio and workspace manager 705 generates a studio definition based on the data provided in GUI 800 and stores the studio definition in studio definitions storage 730.

Figure 9:
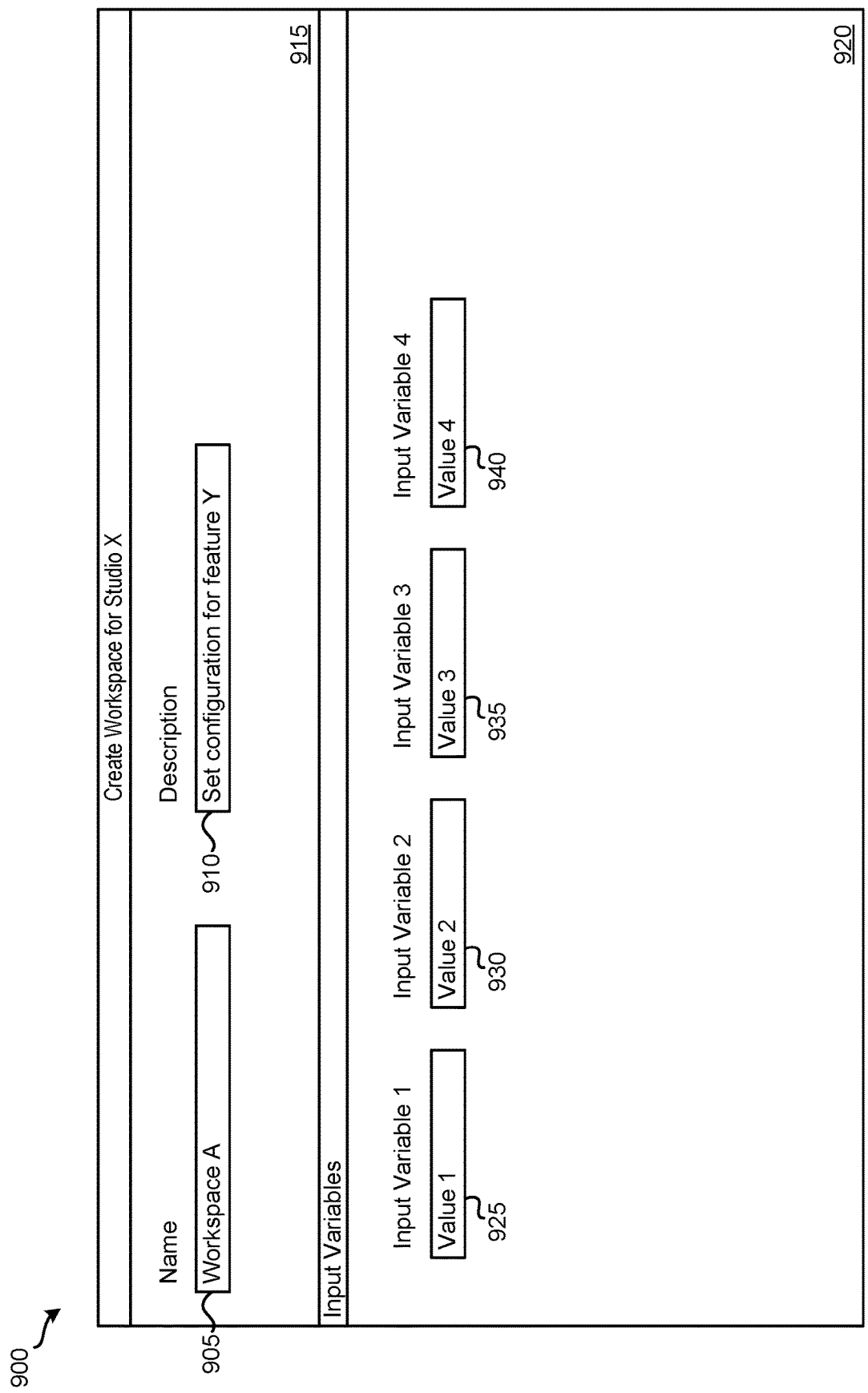
FIG. 9 illustrates a GUI for creating a workspace for a studio according to some embodiments.

FIG. 9 illustrates a GUI 900 for creating a workspace for a studio according to some embodiments. In particular, FIG. 9 illustrates the creation of a workspace associated with the studio created according to FIGS. 8A and 8B. In this example, a user of a client device sent studio and workspace manager 705 a request to create a workspace associated with the studio created according to FIGS. 8A and 8B. In response to receiving the request, studio and workspace manager 705 provides GUI 900 to the client device.

As shown, GUI 900 includes display area 915 and display area 920. Display area 915 includes UI control 905 and UI control 910. UI control 905 is for providing a name of a workspace. UI control 910 is for providing a description of the workspace. For this example, the user of the client device provided, through UI control 905, the name "Workspace A" for the name of the workspace. Additionally, through UI control 910, the user of the client device provided "Set configuration for feature Y" as the description of the workspace. Display area 920 is configured for providing a page for entering values for input variables specified in the studio with which the workspace is associated. Here, the workspace is associated with the studio created according to FIGS. 8A and 8B. As such, display area 920 is providing a page for entering values for input variables 1-4 of that studio. As depicted in FIG. 9, display area 920 includes UI controls 925, 930, 935, 940. UI control 925 is for entering a value for input variable 1, UI control 930 is for entering a value for input variable 2, UI control 935 is for entering a value for input variable 3, and UI control 940 is for entering a value for input variable 4. When the user of the client device is done defining the workspace, the user of the client device can send studio and workspace manager 705 a request to create the workspace (e.g., by selecting a selectable UI item in GUI 900 (not shown) for requesting to create the workspace). In response, studio and workspace manager 705 generates a workspace definition associated with the studio based on the data provided in GUI 900. Then, studio and workspace manager 705 stores the workspace definition in workspace definitions storage 735.

FIG. 9 shows an example of providing one set of values for input variables of a studio via a workspace associated with the studio. In some embodiments, multiple sets of values can be provided for input variables of a studio via a workspace associated with the studio. In some such embodiments, the different sets of values can be assigned priorities, which are utilized during the building of the workspace. FIG. 10 illustrates another GUI 1000 for creating a workspace for a studio according to some embodiments. Specifically, FIG. 10 illustrates an example of creating a workspace where multiple sets of values are provided for input variables of a studio. As depicted in FIG. 10, GUI 1000 includes display area 1015 and display area 1020. Display area 1015 includes UI control 1005 and UI control 1010. UI control 1005 is for providing a name of a workspace. UI control 1010 is for providing a description of the workspace. In this example, a user of a client device has provided, through UI control 1005, the name "Workspace B" for the name of the workspace. The user of the client device has also provided, via UI control 1010, "Set configuration for feature Z" as the description of the workspace.

Display area 1020 is configured for providing a page for entering values for input variables specified in the studio with which the workspace is associated. For this example, the studio that is associated with the workspace specifies two input variables: a resolver input variable and a base input variable, which is specified as a member of the resolver input variable. As illustrated, display area 1020 is providing a page for entering values for a resolver input variable and a base input variable. In particular, display area 1020 includes selectable UI item 1025 and UI controls 1030, 1035, 1040, 1045, 1050, 1055. UI item 1025, when selected, causes display area 1020 to add a set of UI controls for providing values for the resolver input variable and the base input variable. Here, the user of the client device has selected UI item 1025 to cause display area 1020 to add UI controls 1040 and 1045. Then, the user of the client device selected UI item 1025 again to cause display area 1020 to add UI controls 1050 and 1055. As described above, a resolver input variable may be configured to assign its member input variable values to a tag. In this case, value 1 provided in UI control 1035 is assigned to tag value 1 provided in UI control 1030. Similarly, value 2 provided in UI control 1045 is assigned to tag value 2 provided in UI control 1040 and value 3 provided in UI control 1055 is assigned to tag value 3 provided in UI control 1050. After the user of the client device is done defining the workspace, the user of the client device may send studio and workspace manager 705 a request to create the workspace (e.g., by selecting a selectable UI item in GUI 1000 (not shown) for requesting to create the workspace). In response to the request, studio and workspace manager 705 generates a workspace definition associated with the studio based on the data provided in GUI 900. Next, studio and workspace manager 705 stores the workspace definition in workspace definitions storage 735.

Returning to FIG. 7, studio and workspace manager 705 can also handle build requests. For instance, studio and workspace manager 705 may receive from a user of a client device a request to build a studio and a workspace associated with the studio (e.g., via a selection of a UI item (e.g., provided in a GUI for creating or editing the workspace like GUI 900 or GUI 1000) for requesting to build the workspace). In response to the request, studio and workspace manager 705 accesses studio definitions storage 730 to retrieve the studio definition of the studio. Studio and workspace manager 705 also accesses workspace definitions storage 735 to retrieve the workspace definition associated with the studio. Next, studio and workspace manager 705 sends the studio definition, the workspace definition, and the request to build manager 710.

Build manager 710 is configured to manage the building of workspaces and studios. For instance, when build manager 710 receives from studio and workspace manager 705 a studio definition, a workspace definition associated with the studio definition, and a request to build a studio and a workspace associated with the studio, build manager 710 sends validation manager 715 the studio definition, the workspace definition, and a request to validate the values provided in the workspace definition for the input variables specified in the studio definition. Once the values are validated, build manager 710 sends device resolver 720 the studio definition, the workspace definition, and a request to determine network devices affected by the configuration changes proposed in the workspace. Upon receiving a set of affected network devices from device resolver 720, build manager 710 sends configuration manager 725 the studio, the workspace, the set of affected network devices, and a request to configure the network devices.

Validation manager 715 handles the validation of workspaces and studios. For example, validation manager 715 may receive from build manager 710 a studio definition, a workspace definition associated with the studio definition, and a request to validate values provided in the workspace definition for the input variables specified in the studio definition. In response to the request, validation manager 715 performs a variety of different validation operations based on the studio definition and the workspace definition. For instance, validation manager 715 can ensure each value provided in the workspace definition for an input variable specified in the studio definition conforms to the defined format of the input variable and satisfies any constraints specified for the input variable. As an example, if the input variable specified in the studio definition is a string input variable, validation manager 715 validates that the value provided in the workspace definition for the input variable is a string value. If the string input variable includes a range of string length constraint, validation manager 715 determines whether the length of the string value (e.g., the number of characters in the string) satisfies (e.g., is within) the range of string lengths. If the string input variable includes a pattern constraint (e.g., a regular-expression-based pattern constraint, etc.), validation manager 715 determines whether the string value satisfies the pattern constraint. If the string input variable includes an option constraint that specifies a list of valid static and/or dynamic string values, validation manager 715 determines whether the string value is included in the list of valid string values. After validation manager 715 validates each value provided in the workspace definition for an input variable specified in the studio definition, validation manager 715 sends build manager 710 a notification indicating that the studio definition and the workspace definition have been validated.

Device resolver 720 is configured to determine network devices affected by changes to a studio proposed in a workspace. For instance, device resolver 720 may receive from build manager 710 a studio definition, a workspace definition associated with the studio definition, and a request to determine network devices affected by the configuration changes proposed in the workspace definition. In response to the request, device resolver 720 determines if the studio definition includes any resolver input variables. If so, device resolver 720 determines network devices associated with the tag value provided for the resolver input variable based on the tag definition associated with the tag value. Device resolver 720 may determine the network devices by accessing tag definitions storage 740 to identify a tag definition that specifies a tag label that matches the tag value provide for the resolver input variable. Then, device resolver 720 determines a set of network devices based on the set of tag assignments specified in the tag definition. Device resolver 720 determines the set of network devices as being the network devices affected by the resolver input variable.

As explained above, different sets of values may be specified for an input variable, in some embodiments. Each of the sets of values can be assigned different priorities. Referring to FIG. 10 as an example, the first set of values (i.e., values provided in UI controls 1030 and 1035) may be assigned the highest priority, the second set of values (i.e., values provided in UI controls 1040 and 1045) may be assigned the second highest priority, and the third set of values (i.e., values provided in UI controls 1050 and 1055) may be assigned the third highest priority. Since a network device can be associated with multiple tags (e.g., the tag assignments of multiple tag definitions may specify the network device), the network device can have multiple possible values for a particular input variable assigned to it. The priorities assigned to the different sets of values are utilized to determine which value for the particular input variable (e.g., the one associated with the highest priority) to use for the network device.

For cases where the input variable is a base input variable, device resolver 720 can determine that every network device in the network is affected by the base input variable. Device resolver 720 determines affected network devices for each input variable specified in the studio definition. Then, device resolver 720 sends build manager 710 the network devices affected by the changes to the studio definition proposed in the workspace definition.

Configuration manager 725 is responsible for configuring network devices (e.g., network devices 125a-n). For example, configuration manager 725 can receive from build manager 710 a studio definition, a workspace definition associated with the studio definition, a set of affected network devices, and a request to configure these network devices. In response, configuration manager 725 generates a set of commands (e.g., CLI commands) for each network device in the set of affected network devices based on the studio definition and the workspace definition. Specifically, configuration manager 725 generates the set of commands for a network device based on the values provided for the input variables specified in the studio definition and the set of instructions specified in the template of the studio definition. Configuration manager 725 may use the generated set of commands and device data stored in device data storage 745 that is associated with the network device (e.g., connection information for connecting to the network device) to configure the corresponding network device.

Figure 11:
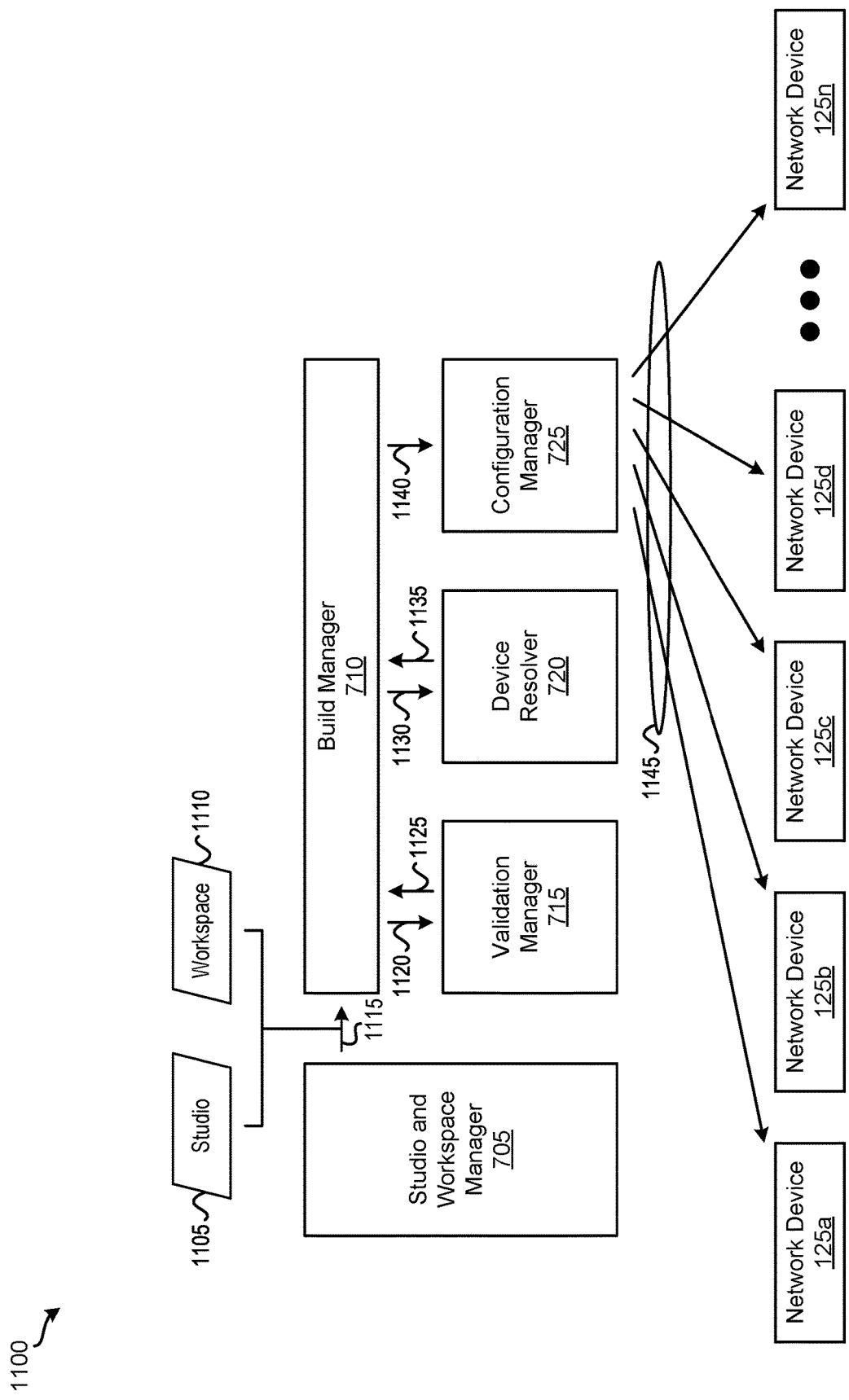
FIG. 11 illustrates an example dataflow through the network management system illustrated in FIG. 1 according to some embodiments.

FIG. 11 illustrates an example dataflow 1100 through network management system 115 according to some embodiments. In particular, dataflow 1100 shows an example build process of a workspace as well as configuration of network devices based on the workspace. In this example, network management system 115 is implemented by network management system 700. Dataflow 1100 starts by studio and workspace manager 705 receiving from a client device a request to build a studio and a workspace associated with the studio. In response, studio and workspace manager 705 accesses studio definitions storage 730 to retrieve studio definition 1105 of the studio and accesses workspace definitions storage 735 to retrieve workspace definition 1110 associated with the studio. Studio and workspace manager 705 then sends, at 1115, studio definition 1105, workspace definition 1110, and the request to build manager 710.

Upon receiving studio definition 1105, workspace definition 1110, and the request, build manager 710 sends, at 1120, validation manager 715 studio definition 1105, workspace definition 1110, and a request to validate the values provided in workspace definition 1110 for the input variables specified in studio definition 1105. In response, validation manager 715 ensures each value provided in workspace definition 1110 for an input variable specified in studio definition 1105 conforms to the defined format of the input variable and satisfies any constraints specified for the input variable. Once validation manager 715 validates each value provided in workspace definition 1110 for an input variable specified in studio definition 1105, validation manager 715 sends, at 1125, build manager 710 a notification indicating that the studio definition and the workspace definition have been validated.

Next, build manager 710 sends, at 1130, device resolver 720 studio definition 1105, workspace definition 1110, and a request to determine network devices 125 affected by the configuration changes proposed in workspace definition 1110. When device resolver 720 receives studio definition 1105, workspace definition 1110, and the request, device resolver 720 determines affected network devices 125 for each input variable specified in studio definition 1105 in the manner described above by reference to FIG. 7. Device resolver 720 then sends, at 1135, build manager 710 the network devices 125 affected by the changes to studio definition 1105 proposed in workspace definition 1110.

When build manager 710 receives the affected network devices 125 from device resolver 720, build manager 710 sends, at 1140, configuration manager 725 studio definition 1105, workspace definition 1110, the set of affected network devices 125, and a request to configure the network devices 125. In response to the request, configuration manager 725 generates a set of commands (e.g., CLI commands) for each network device 125 in the set of affected network devices 125 based on studio definition 1105 and workspace definition 1110. In particular, configuration manager 725 generates the set of commands for a network device 125 based on the values provided for the input variables specified in studio definition 1105 and the set of instructions specified in the template of studio definition 1105. Configuration manager 725 uses the generated set of commands and device data stored in device data storage 745 that is associated with the network device 125 (e.g., connection information for connecting to the network device 125) to configure, at 1145, the corresponding network device 125.

Figure 12:
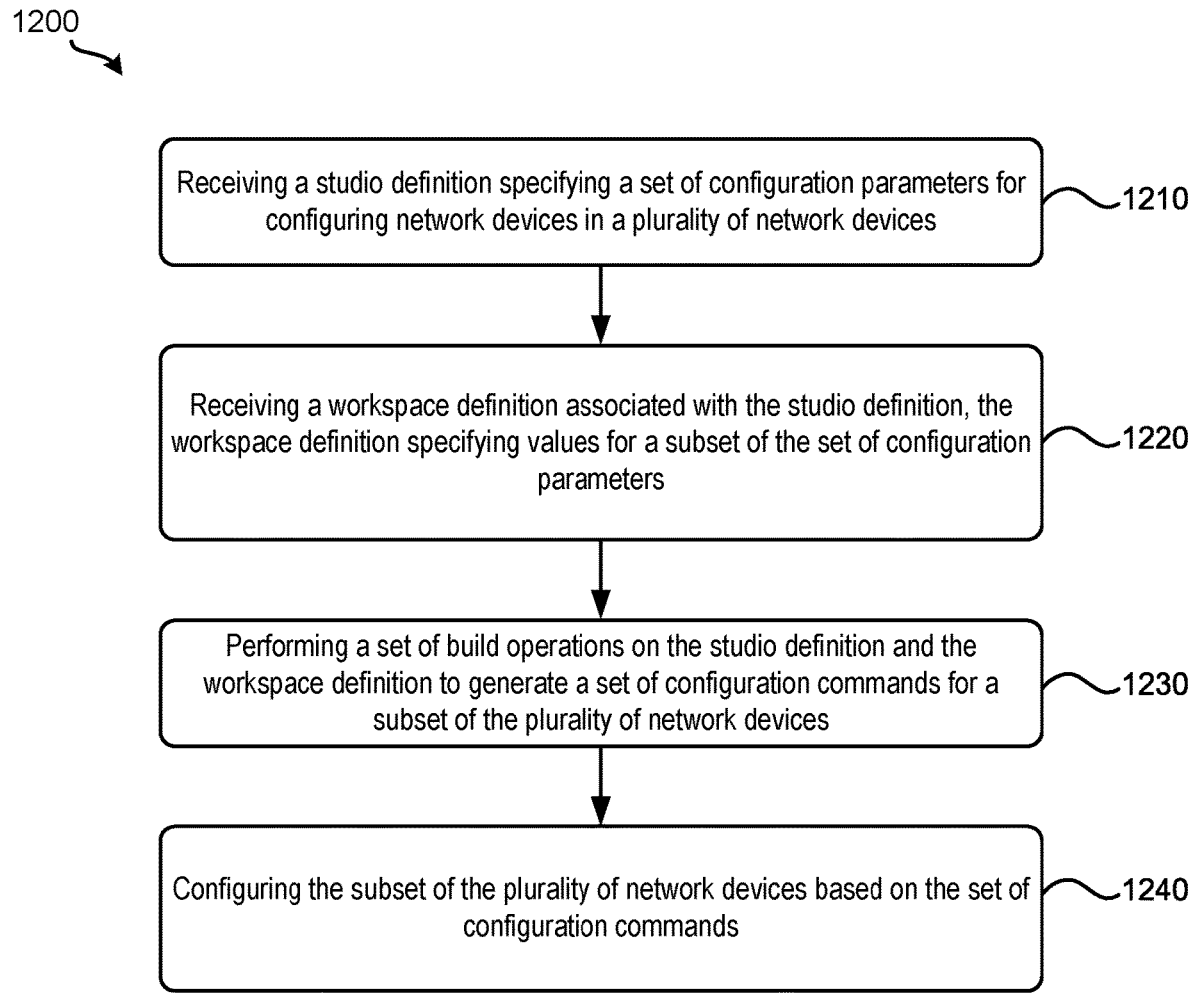
FIG. 12 illustrates a process for building a workspace according to some embodiments.

FIG. 12 illustrates a process 1200 for building a workspace according to some embodiments. In some embodiments, network management system 115 performs process 1200. Process 1200 begins by receiving, at 1210, a studio definition specifying a set of configuration parameters for configuring network devices in a plurality of network devices. Referring to FIGS. 2, 7, 8A, and 8B as an example, network management system 700 can receive a definition of a studio from a user of a client device via GUI 800. Network management system 700 generates studio definition 200 based on the definition of the studio.

Next, process 1200 receives, at 1220, a workspace definition associated with the studio definition, the workspace definition specifying values for a subset of the set of configuration parameters. Referring to FIGS. 5, 7, and 9 as an example, network management system 700 may receive a definition of a workspace from a user of a client device through GUI 900. In response, network management system 700 generates workspace definition 500 based on the definition of the workspace.

Process 1200 then performs, at 1230, a set of build operations on the studio definition and the workspace definition to generate a set of configuration commands for a subset of the plurality of network devices. Referring to FIGS. 7 and 11 as an example, network management system 700 (e.g., build manager 710, validation manager 715, device resolver 720, and configuration manager 725) performs the set of build operations on studio definition 1105 and workspace definition 1110.

Finally, process 1200 configures, at 1240, the subset of the plurality of network devices based on the set of configuration commands. Referring to FIG. 11 as an example, network management system 700 (e.g., configuration manager 725) can configure a subset of the network devices 125a-n based on the set of configuration commands.

Many of the examples and embodiments described above employ GUIs to interact with a network management system (e.g., network management system 115 and network management system 700). In some embodiments, a client device can interact with the network management system in the same way through a set of application programming interfaces (APIs) provided by the network management system.

Figure 13:
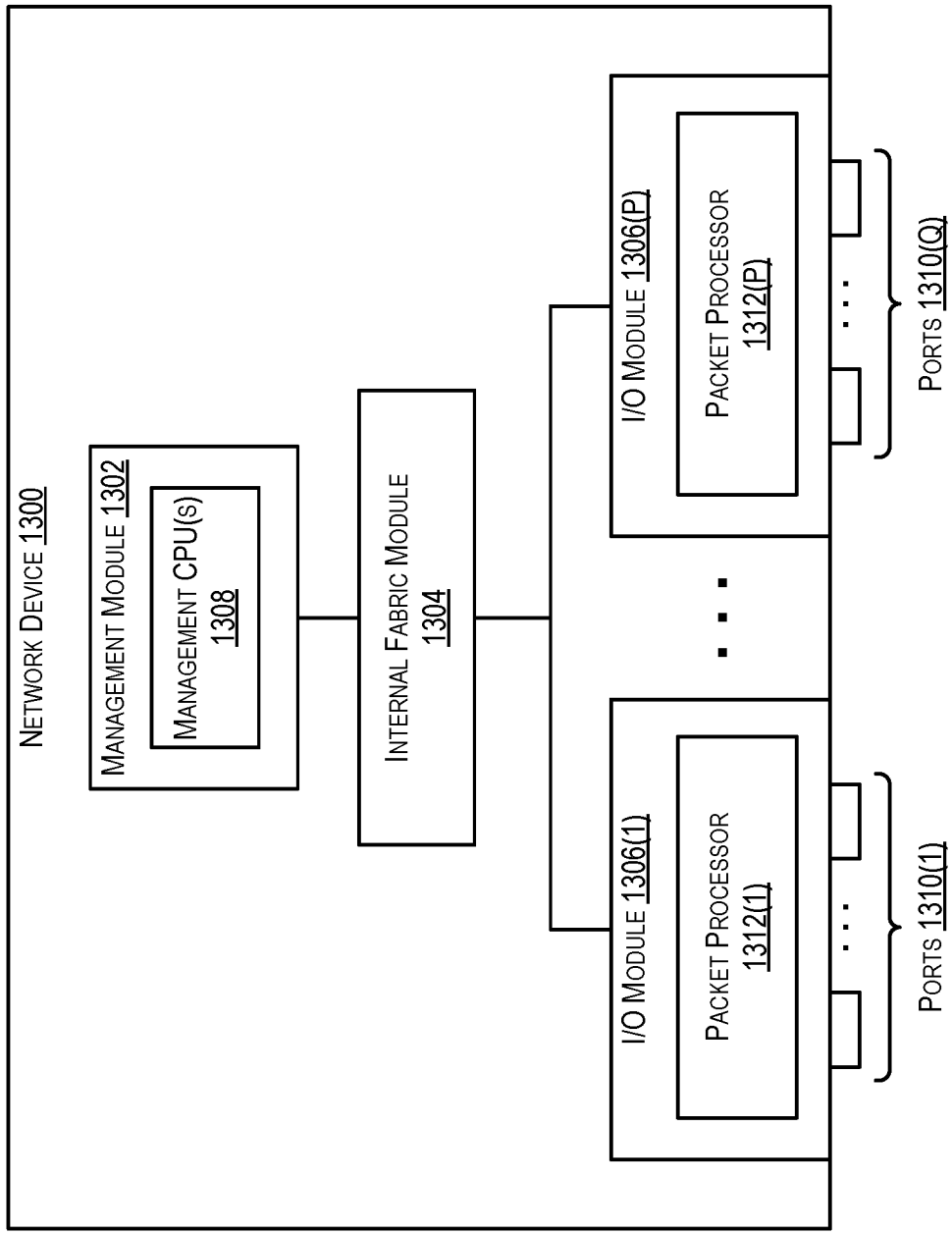
FIG. 13 illustrates an example network device according to some embodiments.

FIG. 13 illustrates the architecture of an example network device (e.g., a network switch or router) 1300 that may implement the techniques of the present disclosure according to certain embodiments. For example, network device 1300 may correspond to each of the network devices 125a-n shown in FIG. 1.

Network device 1300 includes a management module 1302, an internal fabric module 1304, and a number of I/O modules 1306(1)-(P). Management module 1302 includes one or more management CPUs 1308 for managing/controlling the operation of the device. Each management CPU 1308 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 1304 and I/O modules 1306(1)-(P) collectively represent the data, or forwarding, plane of network device 1300. Internal fabric module 1304 is configured to interconnect the various other modules of network device 1300. Each I/O module 1306 includes one or more input/output ports 1310(1)-(Q) that are used by network device 1300 to send and receive network packets. Each I/O module 1306 can also include a packet processor 1312, which is a hardware processing component that can make wire speed decisions on how to handle incoming or outgoing network packets.

It should be appreciated that network device 1300 is illustrative and other configurations having more or fewer components than network device 1300 are possible.

In various embodiments, the present disclosure includes systems, methods, and apparatuses for determining position values for training data that is used to train transformer models. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in some embodiments, a non-transitory machine-readable medium stores a program executable by at least one processing unit of a device. The program comprises sets of instructions for receiving a studio definition specifying a set of configuration parameters for configuring network devices in a plurality of network devices; receiving a workspace definition associated with the studio definition, the workspace definition specifying values for a subset of the set of configuration parameters; performing a set of build operations on the studio definition and the workspace definition to generate a set of configuration commands for a subset of the plurality of network devices; and configuring the subset of the plurality of network devices based on the set of configuration commands.

In some embodiments, the studio definition further specifies a set of instructions for converting values for the set of configuration parameters into commands for configuring network devices in the plurality of network.

In some embodiments, the present disclosure further provides a graphical user interface (GUI) for configuring a plurality of network devices in a network, wherein the studio definition and the workspace definition are received through the GUI.

In some embodiments, the present disclosure further provides a set of application programming interfaces (APIs), wherein the studio definition and the workspace definition are received through the set of APIs.

In some embodiments, the set of build operations comprises validating the values for the subset of the set of configuration parameters based on the studio definition and determining that each network device in the subset of the plurality of network devices is a network device in the plurality of network devices affected by the values for the subset of the set of configuration parameters.

In some embodiments, the present disclosure further receives a set of tag definitions, each tag definition in the set of tag definitions comprising a tag label and a set of tag assignments specifying a set of network devices in the plurality of network devices, wherein determining that each network device in the subset of the plurality of network devices is a network device in the plurality of network devices affected by the values for the subset of the set of configuration parameters comprises determining that each network device in the subset of the plurality of network devices is a network device in the plurality of network devices affected by the values for the subset of the set of configuration parameters based on the set of tag definitions.

In some embodiments, the workspace definition is a first workspace definition associated with the studio definition, wherein the subset of the set of configuration parameters is a first subset of the set of configuration parameters, wherein the program further comprises a set of instructions for receiving a second workspace definition associated with the studio definition, the second workspace definition specifying values for a second subset of the set of configuration parameters.

In some embodiments, the present disclosure further, after the subset of the plurality of network devices are configured based on the set of configuration commands, updates the second workspace definition with changes caused by the configuration of the subset of the plurality of network devices based on the set of configuration commands.

In some embodiments, the set of configuration parameters comprises a container type input variable.

In some embodiments, the set of configuration parameters comprises a base type input variable.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method comprising:
receiving, from a first client device, a first request to create a studio for configuring a single network feature from among a plurality of network features and a schema specifying characteristics of a set of input variables for configuring the single network feature;
in response to the first request, generating a studio definition for the studio based on the schema, wherein the studio definition includes the schema specifying characteristics of the set of input variables for configuring the single network feature;
receiving, from a second client device, a second request to create a workspace for making changes to the studio and specific values for the set of input variables included in the schema of the studio definition;
in response to the second request, generating a first workspace definition, the first workspace definition specifying the received studio definition which configures the single network feature, the first workspace definition specifying specific values for the set of input variables specified in the schema of the received studio definition;
performing a set of build operations using the studio definition and the first workspace definition to generate a set of configuration commands to configure the single network feature on a subset of a plurality of network devices; and
configuring the subset of the plurality of network devices using the set of configuration commands to configure the single network feature on each of the subset of the plurality of network devices.

2. The method of claim 1, wherein the studio definition further specifies a set of instructions for converting values for the set of configuration parameters into commands for configuring the subset of network devices in the plurality of network devices.

3. The method of claim 1 further comprising providing a graphical user interface (GUI) for configuring the subset of the plurality of network devices in a network, wherein the studio definition and the first workspace definition are received through the GUI.

4. The method of claim 1 further comprising providing a set of application programming interfaces (APIs), wherein the studio definition and the first workspace definition are received through the set of APIs.

5. The method of claim 1, wherein the set of build operations comprises:
validating the values for the set of input variables based on the studio definition; and
determining that each network device in the subset of the plurality of network devices is a network device in the plurality of network devices affected by the values for the set of input variables.

6. The method of claim 5 further comprising:
receiving a set of tag definitions, each tag definition in the set of tag definitions comprising a tag label and a set of tag assignments specifying a set of network devices in the plurality of network devices, wherein determining that each network device in the subset of the plurality of network devices is a network device in the plurality of network devices affected by the values for the set of input variables is based on the set of tag definitions.

7. The method of claim 1, further comprising receiving a second workspace definition associated with the studio definition, the second workspace definition specifying second values for the set of input variables.

8. The method of claim 7 further comprising, after the subset of the plurality of network devices are configured based on the set of configuration commands, updating the second workspace definition with changes caused by the configuration of the subset of the plurality of network devices based on the set of configuration commands.

9. A system comprising:
a set of processing units; and
a non-transitory machine-readable medium storing instructions that when executed by at least one processing unit in the set of processing units cause the at least one processing unit to:
receiving, from a first client device, a first request to create a studio for configuring a single network feature from among a plurality of network features and a schema specifying characteristics of a set of input variables for configuring the single network feature;
in response to the first request, generate a studio definition for the studio based on the schema, wherein the studio definition includes the schema specifying characteristics of the set of input variables for configuring the single network feature;
receiving, from a second client device, a second request to create a workspace for making changes to the studio and specific values for the set of input variables included in the schema of the studio definition;
in response to the second request, generate a first workspace definition, the first workspace definition specifying the received studio definition which configures the single network feature, the first workspace definition specifying specific values for the set of input variables specified in the schema of the received studio definition;
perform a set of build operations using the studio definition and the first workspace definition to generate a set of configuration commands to configure the single network feature on a subset of a plurality of network devices; and
configure the subset of the plurality of network devices using the set of configuration commands to configure the single network feature on each of the subset of the plurality of network devices.

10. The system of claim 9, wherein the studio definition further specifies a set of instructions for converting values for the set of configuration parameters into commands for configuring the subset of network devices in the plurality of network devices.

11. A non-transitory machine-readable medium storing a program executable by at least one processing unit of a device, the program comprising sets of instructions for:
receiving, from a first client device, a first request to create a studio for configuring a single network feature from among a plurality of network features and a schema specifying characteristics of a set of input variables for configuring the single network feature;
in response to the first request, generating a studio definition for the studio based on the schema, wherein the studio definition includes the schema specifying characteristics of the set of input variables for configuring the single network feature;
receiving, from a second client device, a second request to create a workspace for making changes to the studio and specific values for the set of input variables included in the schema of the studio definition;
in response to the second request, generating a first workspace definition, the first workspace definition specifying the received studio definition which configures the single network feature, the first workspace definition specifying the specific values for the set of input variables specified in the schema of the received studio definition;
performing a set of build operations using the studio definition and the first workspace definition to generate a set of configuration commands to configure the single network feature on a subset of a plurality of network devices; and
configuring the subset of the plurality of network devices using the set of configuration commands to configure the single network feature on each of the subset of the plurality of network devices,
wherein the subset of the plurality of network devices does not include all of the network devices.

12. The non-transitory machine-readable medium of claim 11, wherein the studio definition further specifies a set of instructions for converting values for the set of configuration parameters into commands for configuring the subset of network devices in the plurality of network devices.

13. The non-transitory machine-readable medium of claim 11, wherein the program further comprises a set of instructions for providing a graphical user interface (GUI) for configuring the subset of the plurality of network devices in a network, wherein the studio definition and the first workspace definition are received through the GUI.

14. The non-transitory machine-readable medium of claim 11, wherein the program further comprises a set of instructions for providing a set of application programming interfaces (APIs), wherein the studio definition and the first workspace definition are received through the set of APIs.

15. The non-transitory machine-readable medium of claim 11, wherein the set of build operations comprises:
validating the values for the set of input variables based on the studio definition; and
determining that each network device in the subset of the plurality of network devices is a network device in the plurality of network devices affected by the values for the set of input variables.

16. The non-transitory machine-readable medium of claim 15, wherein the program further comprises:
a set of instructions for receiving a set of tag definitions, each tag definition in the set of tag definitions comprising a tag label and a set of tag assignments specifying a set of network devices in the plurality of network devices,
wherein determining that each network device in the subset of the plurality of network devices is a network device in the plurality of network devices affected by the values for the set of input variables is based on the set of tag definitions.

17. The non-transitory machine-readable medium of claim 11, wherein the program further comprises a set of instructions for receiving a second workspace definition associated with the studio definition, the second workspace definition specifying second values for the set of input variables.

18. The non-transitory machine-readable medium of claim 17, wherein the program further comprises a set of instructions for, after the subset of the plurality of network devices are configured based on the set of configuration commands, updating the second workspace definition with changes caused by the configuration of the subset of the plurality of network devices based on the set of configuration commands.

19. The non-transitory machine-readable medium of claim 11, wherein the set of configuration parameters comprises a container type input variable.

20. The non-transitory machine-readable medium of claim 11, wherein the set of configuration parameters comprises a base type input variable.

* * * * *